United States Patent
You et al.

(10) Patent No.: US 10,845,654 B2
(45) Date of Patent: Nov. 24, 2020

(54) METHOD FOR MANUFACTURING OPTICAL DEVICE BY VARYING RUBBING STRENGTH

(71) Applicant: LG Chem, Ltd., Seoul (KR)

(72) Inventors: Jung Sun You, Daejeon (KR); Dong Ho Ko, Daejeon (KR); Hyo Jin Lee, Daejeon (KR); In Ju Mun, Daejeon (KR); Nam Gyu Kim, Daejeon (KR); Hyun Jun Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/650,265

(22) PCT Filed: Sep. 21, 2018

(86) PCT No.: PCT/KR2018/011304
§ 371 (c)(1),
(2) Date: Mar. 24, 2020

(87) PCT Pub. No.: WO2019/066428
PCT Pub. Date: Apr. 4, 2019

(65) Prior Publication Data
US 2020/0225520 A1 Jul. 16, 2020

(30) Foreign Application Priority Data
Sep. 29, 2017 (KR) .......... 10-2017-0127825

(51) Int. Cl.
*G02F 1/1341* (2006.01)
*G02F 1/1343* (2006.01)
(Continued)

(52) U.S. Cl.
CPC ...... *G02F 1/1341* (2013.01); *G02F 1/133305* (2013.01); *G02F 1/133711* (2013.01);
(Continued)

(58) Field of Classification Search
CPC ............ G02F 1/1341; G02F 1/134309; G02F 1/133784; G02F 1/133711; G02F 1/133305; G02F 2001/13415; G02F 2202/043
See application file for complete search history.

(56) References Cited

U.S. PATENT DOCUMENTS

| 6,172,727 B1 | 1/2001 | Ozaki et al. |
| 2012/0099065 A1 | 4/2012 | Jang |

(Continued)

FOREIGN PATENT DOCUMENTS

| JP | 2004191754 A | 7/2004 |
| KR | 20030037791 A | 5/2003 |

(Continued)

OTHER PUBLICATIONS

Kim_et_al._Korean_patent_application_Publication_KR20080079564A_Sep. 2008_machine_translation.pdf (Year: 2008).*

(Continued)

*Primary Examiner* — Tracie Y Green
(74) *Attorney, Agent, or Firm* — Lerner, David, Littenberg, Krumholz & Mentlik, LLP

(57) ABSTRACT

A method for manufacturing an optical device and an optical device is provided. The manufacturing method is capable of minimizing or eliminating dotting unevenness that may occur when an optical device is manufactured by a dotting process. In particular, even when a large cell gap is present or a polymer substrate is applied as a substrate so that high-temperature heat treatment is impossible, such method of the present application can provide an alignment film having improved orientation by improving the dotting unevenness.

11 Claims, 5 Drawing Sheets

(51) Int. Cl.
*G02F 1/1337* (2006.01)
*G02F 1/1333* (2006.01)

(52) U.S. Cl.
CPC .. *G02F 1/133784* (2013.01); *G02F 1/134309* (2013.01); *G02F 2001/13415* (2013.01); *G02F 2202/043* (2013.01)

(56) References Cited

U.S. PATENT DOCUMENTS

| | | | |
|---|---|---|---|
| 2015/0370134 A1 | 12/2015 | Li et al. | |
| 2016/0291357 A1 | 10/2016 | Min et al. | |
| 2016/0377902 A1* | 12/2016 | Min | G02F 1/13439 349/16 |
| 2017/0205669 A1* | 7/2017 | Ono | G02F 1/133514 |
| 2019/0079327 A1 | 3/2019 | Kim et al. | |
| 2019/0384094 A1* | 12/2019 | Lee | B32B 7/00 |
| 2020/0096807 A1* | 3/2020 | Gim | G02B 27/0176 |
| 2020/0142246 A1* | 5/2020 | Gim | G02F 1/13725 |

FOREIGN PATENT DOCUMENTS

| | | |
|---|---|---|
| KR | 20060054806 A | 5/2006 |
| KR | 20080079564 A | 9/2008 |
| KR | 20120042169 A | 5/2012 |
| KR | 20170072573 A | 6/2017 |
| WO | 2015133878 A1 | 9/2015 |

OTHER PUBLICATIONS

Search report from International Application No. PCT/KR2018/011304, dated Jan. 8, 2019.
Extended European Search Report including Written Opinion for Application No. EP18860995.2, dated Jul. 3, 2020, pp. 1-5.

\* cited by examiner

[Figure 1]
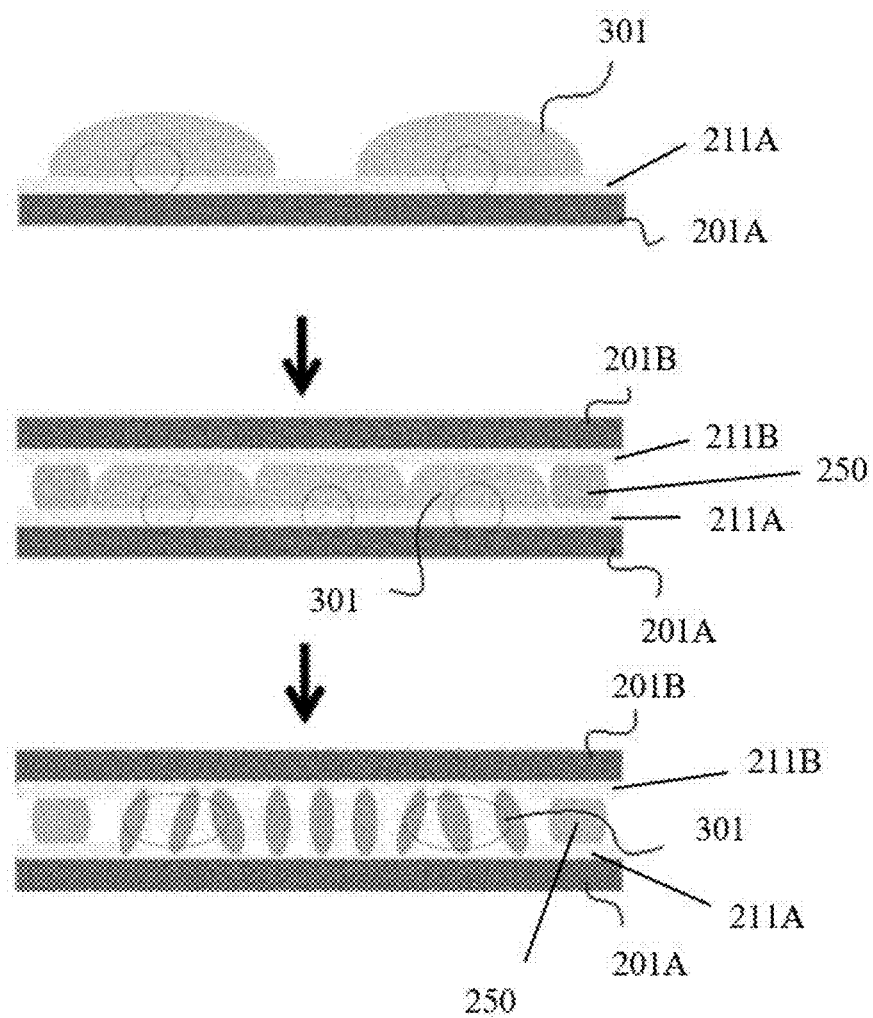

[Figure 2]
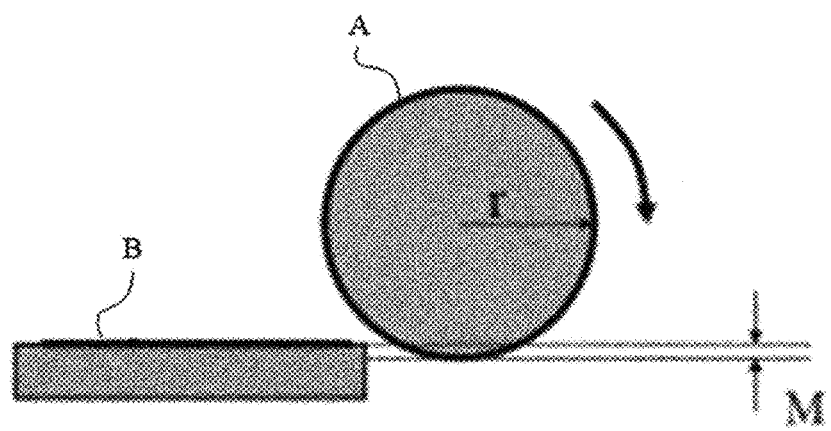
[Figure 3]
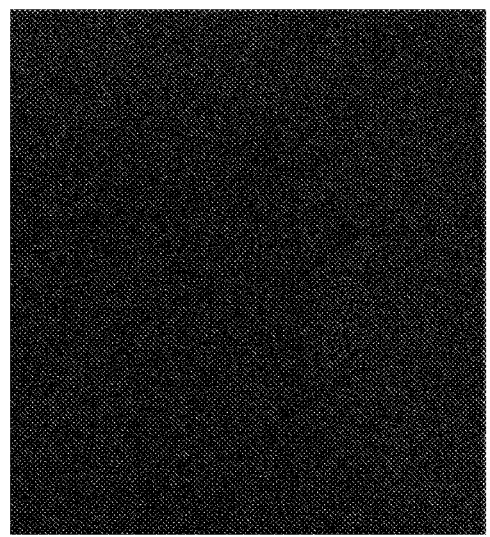

[Figure 4]
[Figure 5]
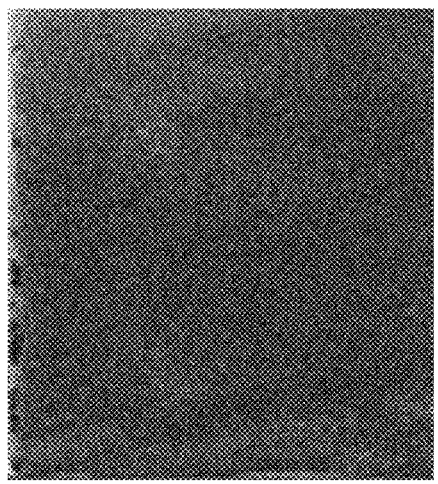

[Figure 6]
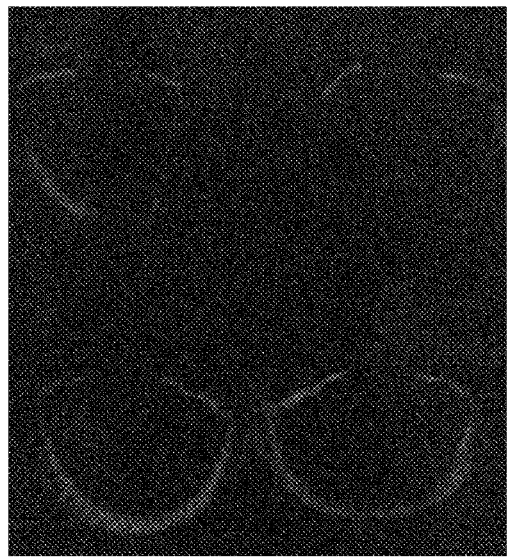
[Figure 7]
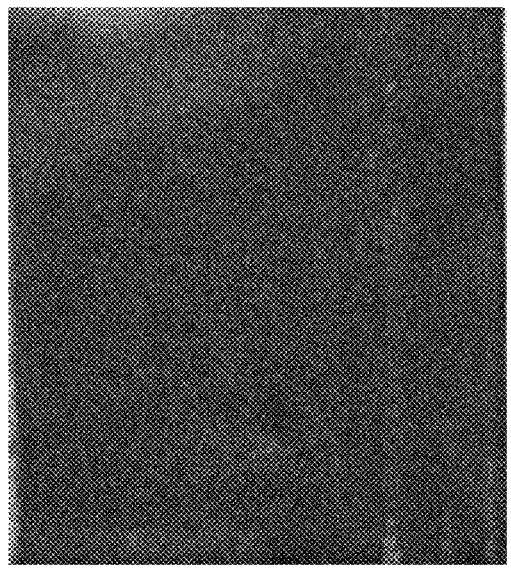

[Figure 8]
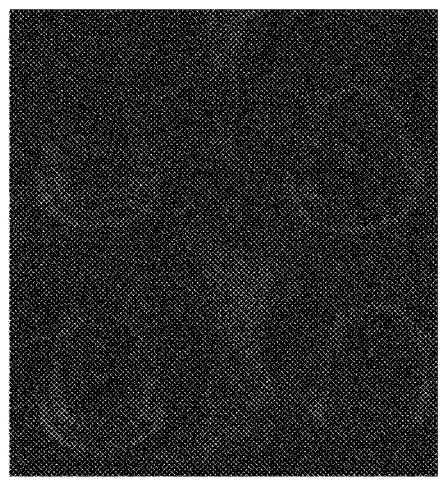

METHOD FOR MANUFACTURING OPTICAL DEVICE BY VARYING RUBBING STRENGTH

CROSS-REFERENCE TO RELATED APPLICATION(S)

The present application is a national phase entry under 35 U.S.C. § 371 of International Application No PCT/KR2018/011304 filed Sep. 21, 2018 which claims priority from Korean Patent Application No. 10-2017-0127825 filed on Sep. 29, 2017, the disclosure of which is incorporated herein by reference in its entirety.

TECHNICAL FIELD

The present application relates to a method for manufacturing an optical device and an optical device.

BACKGROUND ART

An optical device capable of adjusting light transmittance or color, and the like by disposing a light modulating layer between substrates is known. For example, in Patent Document 1, a so-called GH cell (guest host cell) in which a mixture of a liquid crystal host and a dichroic dye guest is applied is known.

Methods for manufacturing optical devices are variously known. One method of them is a method of dotting a light modulating material on a substrate having an alignment film formed on its surface and pressing an opposing substrate onto the doted light modulating material so that the light modulating material spreads in a gap between the substrates and simultaneously fills the gap (also referred to as VALC (vacuum assembly LC) or ODF (one drop filling)) (hereinafter, may be referred to as a dotting process).

FIG. 1 is a diagram illustratively showing progression of such a dotting process. As shown in FIG. 1, the dotting process can be performed by dotting a light modulating material (301) on suitable sites on a substrate (201A) and then pressing another substrate (201B) with a roller or the like and bonding it together so that the dotted light modulating material spreads evenly between the substrates. However, the process shown in FIG. 1 is an example of the dotting process, where the actual dotting process can be variously changed based on the method shown in FIG. 1.

Such a method can reduce liquid crystal consumption because only a necessary amount of liquid crystal can be accurately used as compared with other methods, and can greatly improve productivity by reducing TAT (turnaround time) even in the case of area enlargement and the like. However, the above method often causes dotting unevenness due to orientation defects in regions where the light modulating material is dotted and spreading during the pressing.

DISCLOSURE

Technical Problem

The present application relates to a method for manufacturing an optical device and an optical device. It is one object of the present application to provide a method for manufacturing a device having excellent performance without dotting unevenness and an optical device manufactured in such a manner.

Technical Solution

The present application relates to a method for manufacturing an optical device, and in one example, it relates to a method for manufacturing an optical device by applying a dotting process.

In the category of the term optical device, all kinds of devices may be included, which are formed so as to be capable of switching between two or more different optical states, for example, high transmittance and low transmittance states, high transmittance, intermediate transmittance and low transmittance states, states where different colors are implemented, and the like.

The manufacturing method may comprise a process of rubbing an alignment film formed on a base layer under specific conditions.

That is, in general, an optical device is manufactured by oppositely disposing alignment films 211A, 212B of two substrates 201A, 201B that the alignment films are formed on the surfaces and forming a light modulating layer 301 between the oppositely disposed alignment films 211A, 212B, where a spacer 250 for maintaining a cell gap is formed on any one of the two substrates 211A, 212B.

The inventors of the present invention have confirmed that when rubbing treatment for imparting orientation to such two substrates is performed, an optical device can be manufactured without dotting unevenness by varying a rubbing strength.

In general, the rubbing treatment of the alignment film is performed in the same manner as shown in FIG. 2 using a rubbing drum, where the rubbing strength is determined by Equation 1 below.

$$RS = 2 \times N \times M \times \pi \times rn \times r/(v-1) \qquad \text{[Equation 1]}$$

In Equation 1, RS is a rubbing strength, N is a number of rubbing times, M is a rubbing depth (unit: mm), r is a radius (unit: mm) of a rubbing drum, n is a rotation speed (unit: rpm) of the rubbing drum, and v is a relative moving speed (unit: mm) of the substrate to the rubbing drum.

Also, in this specification, the symbol 7E is the circular constant, unless otherwise specified.

Here, the number of rubbing times (N) represents how many times the rubbing drum has passed the substrate.

Here, the number of rubbing times is a number indicating how many times the rubbing drum has moved on the surface of the substrate, which is usually in a range of 1 to 10, 1 to 9, 1 to 8, 1 to 7, 1 to 6, 1 to 5, 1 to 4, 1 to 3 or 1 to 2 or so.

In Equation 1 above, the rubbing depth (M) (unit: mm) may be usually 0 mm to 2 mm or so. In one example, the rubbing depth may be about 0.005 mm or more or so, and may also be 1 mm or less or so.

In Equation 1 above, the range of the radius (r) of the rubbing drum may also be a typical range, and for example, may be in a range of about 50 mm to 300 mm, about 50 mm to 250 mm, about 50 mm to 200 mm, about 50 mm to 150 mm or about 50 mm to 100 mm or so.

In Equation 1 above, the rotation speed (n) of the rubbing drum may be usually in a range of 500 to 2000 rpm and the relative moving speed (v) of the substrate to the rubbing drum may be usually in a range of about 500 to 2000 mm/sec.

In the present application, the process can be performed so that the above-described rubbing strength can be secured in such a typical range.

That is, as in FIG. 2, the rubbing process is generally performed while rotating the rubbing drum (A) and moving the substrate (B) on which the alignment film is formed to contact the rotating rubbing drum, and in this rubbing process, the method of determining the rubbing strength by Equation 1 above is known. In FIG. 2, the radius (r) of the rubbing drum (A) and the rubbing depth (M) are indicated.

The inventors of the present invention have confirmed that in rubbing alignment films of a substrate (hereinafter, first substrate 211A) as a base layer on which an alignment film 211A and a spacer 250 are formed and a substrate (second substrate 211B) as a base layer on which an alignment film 211B is formed and no spacer is formed, respectively, the optical device can be manufactured without dotting unevenness by controlling the rubbing strength determined by Equation 1 above.

That is, the manufacturing method of the optical device comprises steps: rubbing a rubbing alignment film of a first substrate including a base layer, and a spacer and the alignment film formed on the base layer; rubbing a rubbing alignment film of a second substrate including a base layer and the alignment film formed on the base layer, wherein no spacer is present; and forming a light modulating layer between the alignment films of the first and second substrates, wherein a rubbing strength (RS1) determined by Equation 1 above at the time of rubbing the first substrate alignment film and a rubbing strength (RS2) determined by Equation 1 above at the time of rubbing the second substrate alignment film satisfy Equation 2 below.

$$RS1<RS2 \quad \text{[Equation 2]}$$

In the manufacturing method of the present application, as long as each of the rubbing strengths (RS1, RS2) satisfies the above condition, the specific range thereof is not particularly limited, which can be controlled so that a proper orientation capability can be ensured.

In one example, the rubbing strength (RS1) at the time of rubbing the first substrate alignment film may be in a range of about 2.5 to 100. Within this range, the proper orientation capability can be ensured and the dotting unevenness can be prevented. In another example, the rubbing strength (RS1) may be about 3 or more. In another example, the rubbing strength (RS1) may also be in a range of about 95 or less, 90 or less, 85 or less, 80 or less, 75 or less, 70 or less, 65 or less, 60 or less, 55 or less, 50 or less, 45 or less, 40 or less, 35 or less, 30 or less, 25 or less, 20 or less, 15 or less, 10 or less, or 5 or less or so.

The average (arithmetic average) of the rubbing strength (RS1) at the time of rubbing the first substrate alignment film and the rubbing strength (RS2) at the time of rubbing the second substrate alignment film may be in a range of about 12 to 250 or less. Within this range, the proper orientation capability can be ensured and the dotting unevenness can be prevented. In another example, the average may also be in a range of about 240 or less, 230 or less, 220 or less, 210 or less, 200 or less, 190 or less, 180 or less, 170 or less, 160 or less, 150 or less, 140 or less, 130 or less, 120 or less, 110 or less, 100 or less, 90 or less, 80 or less, 70 or less, 60 or less, 50 or less, 40 or less, 30 or less, 20 or less, or 15 or less.

The type of the substrate applied in the manufacturing method is not particularly limited, and generally, a substrate on which an alignment film is formed on a known base layer in a known manner can be applied.

Here, as the base layer, for example, any base layer used as a substrate in a configuration of a known optical device such as an LCD (liquid crystal display) can be applied without particular limitation. For example, the base layer may be an inorganic base layer or an organic base layer. As the inorganic base layer, a glass base layer or the like can be exemplified, and as the organic base layer, various plastic films or the like can be exemplified. The plastic film can be exemplified by a TAC (triacetyl cellulose) film; a COP (cycloolefin copolymer) film such as a norbornene derivative; an acrylic film such as PMMA (poly(methyl methacrylate); a PC (polycarbonate) film; a polyolefin film such as PE (polyethylene) or PP (polypropylene); a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenemaphthatate) film; a PET (polyethyleneterephtalate) film; a PI (polyimide) film; a PSF (polysulfone) film or a PAR (polyarylate) film, and the like, but is not limited thereto.

In particular, the manufacturing method of the present application may be useful when an organic base layer, for example, a plastic film, is used as the base layer. When the dotting unevenness or the like occurs, a method of removing the unevenness by treating the device in which the unevenness occurs or the like at high temperature, for example, a method of removing the unevenness by treating it at a temperature of Tni or higher of a liquid crystal compound which is an example of a light modulating material, is known. However, when the organic base layer is used as the substrate, the heat resistance of the organic base layer is lowered, so that it is difficult to perform the heat treatment process at a high temperature. However, by the method described in this specification, it is possible to prevent dotting unevenness even without the high-temperature treatment as described above, so that an alignment film having excellent physical properties can be formed even when the organic base layer is applied.

Also, in the present application, the thickness of the base layer is not particularly limited, where an appropriate range may be selected depending on the application.

The alignment film of the substrate applied to the manufacturing method of the present application may also be formed directly on the base layer, and in a state where other layers or structures exist on the base layer, it may also be formed on the other layers or structures.

Here, an example of other layers or structures is not particularly limited and includes all known layers and structures necessary for driving and configuring an optical device. An example of such a layer or structure includes an electrode layer or a spacer, and the like.

As described above, the first substrate is a substrate on which the spacer exists, and the second substrate is a substrate on which the spacer is not present.

An alignment film is formed on the base layer in order to adjust the aligned state of the liquid crystal compound. The kind of the alignment film applied in the present application is not particularly limited, and a known alignment film can be used. For example, all the known alignment films can be applied, which satisfy appropriate coating properties, solubility in solvents, heat resistance, chemical resistance, durability against orientation treatment such as rubbing, and the like, exhibit appropriate tilting characteristics as needed, and satisfy physical properties such as a proper voltage holding ratio (VHR) and a high contrast ratio through impurity management. The alignment film may be, for example, a vertical or horizontal alignment film. As the vertical or horizontal alignment film, any alignment film having a vertical or horizontal orientation capability with respect to the liquid crystal compound of the adjacent liquid crystal layer can be selected without any particular limitation and used.

As an alignment film forming material comprising an alignment film forming substance, for example, an alignment film forming material prepared by dispersing, diluting and/or dissolving an alignment film forming substance in an appropriate solvent, that is, an alignment film forming material comprising an alignment film forming substance and a solvent can be applied to form an alignment film in a known manner.

As the kind of the alignment film forming substance, all kinds of substances known to be capable of exhibiting an orientation capability such as a vertical or horizontal orientation capability to liquid crystals by an appropriate rubbing treatment can be used. Such a substance can be exemplified by a substance known to exhibit an orientation capability by rubbing orientation or the like, such as a polyimide compound, a polyvinyl alcohol compound, a polyamic acid compound, a polystylene compound, a polyamide compound and a polyoxyethylene compound.

The alignment film forming material can be prepared by diluting, dispersing and/or dissolving such an alignment film forming substance in the solvent. At this time, basically, the applicable solvent is not particularly limited. For example, as the solvent, any one selected from a cycloalkane having 3 to 12 carbon atoms or 3 to 8 carbon atoms such as cyclohexane, DMSO (dimethyl sulfoxide), THF (tetrahydrofuran), DMF (dimethylformamide), NMP (N-methyl-pyrrolidone), chloroform ($CHCl_3$), a ketone having 1 to 12 carbon atoms or 3 to 8 carbon atoms such as cyclohexanone or cyclopentanone, an alcohol having 1 to 12 carbon atoms or 1 to 8 carbon atoms such as 2-butoxyethanol or butanol, or a glycol having 1 to 12 carbon atoms or 1 to 8 carbon atoms such as ethylene glycol or butylene glycol, or a mixed solvent of two or more selected from the foregoing can be applied.

Also, the concentration of the alignment film forming substance in the alignment film forming material is not particularly limited, which can be appropriately controlled according to the kind of the substance or solvent used.

In the present application, an alignment film is formed using such an alignment film forming material, and in this case, the forming method is not particularly limited. For example, the alignment film formation process may comprise a process of forming a layer of an alignment film forming material on the base layer and performing a known process, such as alignment treatment, on the formed layer. A pretreatment process such as a drying process may also be performed when the layer of the alignment film forming material is formed by coating or the like and the time to calcination is not constant for each substrate or when it is not immediately after coating. For example, the process such as the drying and/or heat treatment may be performed using a suitable drier, oven or hot plate, and the like.

The thickness of the alignment film formed by such a process is not particularly limited, and for example, the thickness may be adjusted in a range of about 50 nm or more and about 1,000 nm or less, 900 nm or less, 800 nm or less, 700 nm or less, 600 nm or less, 500 nm or less, 400 nm or less, 300 nm or less, or 200 nm or less or so.

In the manufacturing method of the present application, a step of performing the orientation treatment, that is, a rubbing step is performed on the formed alignment film (layer of the alignment film forming material), and in this case, the rubbing strength can be adjusted in the above manner. The rubbing treatment can be performed using known means such as a rubbing drum, as described above, and for example, a rubbing drum using a rubbing cloth made of cotton, rayon or nylon, and the like can be used.

The manufacturing method of the present application may further comprise steps of dotting a light modulating material containing a liquid crystal compound on any one alignment film of the first and second substrates thus formed and pressing the other substrate of the first and second substrates in a state of being disposed opposite to the alignment film on which the light modulating material is dotted so that the dotted light modulating material fills the gap between the alignment films of the substrates.

The above process can be performed, for example, according to a progress method of general dotting processes, and the specific progress method is not particularly limited.

In addition, the material of the applied liquid crystal compound and the like is not particularly limited, and a known suitable material is selected as necessary.

There is no particular limitation on the gap between the base layer and the opposing substrate, that is, the so-called cell gap. However, in one example, the gap may be about 4 µm or more. In another example, the gap may be about 5 µm or more, about 6 µm or more, about 7 µm or more, about 8 µm or more, and the upper limit may be about 20 µm, about 18 µm, about 16 µm, about 14 µm, about 12 µm or about 10 µm or so. Typically, in the case where the cell gap is small, for example, when the cell gap is less than about 4 µm, the problem of the dotting unevenness does not become significant even when the dotting process is applied, but the above problem is magnified when the cell gap becomes large. However, in some cases, a high cell gap is required for an optical device as required, where if the method of the present application is applied, the dotting unevenness can be minimized or suppressed even in the manufacture of a device having a high cell gap.

If desired, the light modulating material may further comprise a dichroic dye. For example, the dichroic dye can be divided into two types, where in a molecule that absorbs more light in a particular direction than in another direction, the dye absorbing polarized light in the long axis direction of the molecule may mean a positive dichroic dye or a p-type dye and the dye absorbing light in the vertical direction may mean a negative dichroic dye or an n-type dye. Generally, such a dye may have an absorption spectrum in a narrow region around a wavelength causing maximum absorption. In addition, the dyes used in the guest host LCD display may be evaluated by characteristics such as chemical and optical stability, color and absorption spectrum widths, dichroism ratios, degree of color order, solubility in hosts, degree of deionization, extinction coefficients and purity, and high resistivity. Unless otherwise specified, dichroic dyes are assumed to be positive dyes.

In this specification, the term "dye" may mean a material that is capable of intensively absorbing and/or deforming light within at least some or the entire range in a visible light region, for example, a wavelength range of 400 nm to 700 nm, and the term "dichroic dye" may mean a material capable of dichroic absorption of light in at least some or the entire range of the visible light region.

As the dichroic dye, for example, a known dye known to have properties that can be aligned according to the aligned state of the liquid crystals can be selected and used. As the dichroic dye, for example, a black dye can be used. Such a dye is known, for example, as an azo dye or an anthraquinone dye, but is not limited thereto.

The dichroic ratio of the dichroic dye can be appropriately selected in consideration of the object of the present application. For example, the dichroic dye may have a dichroic ratio of 5 or more to 20 or less. In this specification, the term "dichroic ratio" may mean, for example, in the case of a p-type dye, a value obtained by dividing the absorption of the polarized light parallel to the long axis direction of the dye by the absorption of the polarized light parallel to the direction perpendicular to the long axis direction. The anisotropic dye may have the dichroic ratio at least at some wavelengths or at any wavelength within the wavelength range of the visible light region, for example, within the wavelength range of about 380 nm to 700 nm or about 400 nm to 700 nm.

The present application also relates to an optical device, for example, an optical device manufactured by the manufacturing method. Such an optical device may comprise the first substrate; the second substrate disposed opposite to the first substrate; and a light modulating material present between the first and second substrates.

The light modulating material may comprise a liquid crystal compound and a dichroic dye. When the light modulating material comprises both a liquid crystal compound and a dichroic dye, the light modulating material may act as a guest-host type light modulating material. That is, as the dichroic dye is arranged together according to the arrangement of the liquid crystal compound, the guest-host type light modulating material may exhibit an anisotropic light absorbing effect by absorbing light parallel to the alignment direction of the dye and transmitting perpendicular light. In addition, the content of the anisotropic dye in the light modulating material may be suitably selected in consideration of the object of the present application. For example, the content of the anisotropic dye in the light modulating material may be 0.1 wt % or more to 10 wt % or less.

Furthermore, the cell gap of the optical device, that is, the gap between the first and second substrates is not particularly limited. However, in one example, the gap may be about 4 µm or more. In another example, the gap may be about 5 µm or more, about 6 µm or more, about 7 µm or more, or about 8 µm or more, and the upper limit may be about 20 µm, about 18 µm, about 16 µm, about 14 µm, about 12 µm or about 10 µm or so.

Advantageous Effects

The present application provides a manufacturing method capable of minimizing or eliminating dotting unevenness that may occur when an optical device is manufactured by a dotting process. In particular, even when a large cell gap is present or a polymer substrate is applied as a substrate so that high-temperature heat treatment is impossible, such a method of the present application can provide an alignment film having improved orientation by improving the dotting unevenness.

BRIEF DESCRIPTION OF DRAWINGS

FIG. 1 is a diagram showing progression of one exemplary dotting process.

FIG. 2 is a diagram illustratively showing a rubbing process using a rubbing drum.

FIGS. 3 to 8 are results of evaluating whether or not dotting unevenness occurs in Examples or Comparative Examples.

EXPLANATION OF REFERENCE NUMERALS 201A, 201B: substrate
301: light modulating material

MODE FOR INVENTION

Hereinafter, the present application will be described in detail by way of examples according to the present application and comparative examples not complying with the present application, but the scope of the present application is not limited by the following examples.

1. Identification of Dotting Unevenness

Dotting unevenness was identified in the following manner. After the liquid crystals in the light modulating material were horizontally aligned by applying a voltage to each of the optical devices manufactured in Examples or Comparative Examples, a linear polarizer was positioned so as to be perpendicular to the optical axis of the horizontally oriented liquid crystals and then the presence or absence of the dotting unevenness was identified.

Example 1

A PC (polycarbonate) film, in which an ITO (indium tin oxide) electrode layer, a known polyimide vertical alignment film (Nissan, SE-5661) and a ball spacer capable of holding a cell gap of about 12 µm or so were present on one side, was used as a first substrate, and a PC film having the same structure as that of the first substrate but no spacer was used as a second substrate. In the film, the alignment film was formed on the electrode layer, and the spacer in the first substrate was fixed in the alignment film. The alignment films of the first and second substrates were rubbed in the manner shown in FIG. 2. At this time, it was controlled that the rubbing strength (RS1) of the first substrate was about 3 or so and the rubbing strength (RS2) of the second substrate was about 20.9. Specifically, in the case of the rubbing strength (RS1), the number of rubbing times (N) in Equation 1 was 1, the rubbing depth (M) was about 0.008 mm or so, the radius (r) of the rubbing drum was about 70 mm, the rotation speed (n) of the rubbing drum was about 1000 rpm, and the moving speed (v) of the substrate was about 1160 mm/sec. In addition, in the case of the rubbing strength (RS2), the number of rubbing times (N) in Equation 1 was 1, the rubbing depth (M) was about 0.055 mm or so, the radius (r) of the rubbing drum was about 70 mm, the rotation speed (n) of the rubbing drum was about 1000 rpm, and the moving speed (v) of the substrate was about 1160 mm/sec.

After the above process, an adhesive usually applied to manufacture a liquid crystal cell was coated on the end of the first substrate and a light modulating material (a mixture of HNG730200 liquid crystals from HCCH (ne: 1.551, no: 1.476, ε∥: 9.6, 6ε⊥: 9.6, TNI: 100° C., Δn: 0.075, Δε: −5.7 and an anisotropic dye (BASF, X12)) was dotted and then the second substrate was bonded together thereto, whereby the dotted light modulating material spread evenly between the two substrates to manufacture an optical device. FIG. 3 is the result of observing the presence of dotting unevenness on the optical device formed in the above-described manner, where the dotting unevenness has not been observed as in FIG. 3.

Comparative Example 1

An optical device was manufactured in the same manner as in Example 1, except that the rubbing strength (RS1) of the alignment film in the first substrate was about 20.9 or so and the rubbing strength (RS2) of the alignment film in the second substrate was 7.6. Specifically, in the case of the rubbing strength (RS1), the number of rubbing times (N) in Equation 1 was 1, the rubbing depth (M) was about 0.055 mm or so, the radius (r) of the rubbing drum was about 70 mm, the rotation speed (n) of the rubbing drum was about 1000 rpm, and the moving speed (v) of the substrate was about 1160 mm/sec. In addition, in the case of the rubbing strength (RS2), the number of rubbing times (N) in Equation 1 was 1, the rubbing depth (M) was about 0.02 mm or so, the radius (r) of the rubbing drum was about 70 mm, the rotation speed (n) of the rubbing drum was about 1000 rpm, and the moving speed (v) of the substrate was about 1160 mm/sec.

FIG. 4 is the result of observing the presence of dotting unevenness on the optical device formed in the above-described manner, where the dotting unevenness was severely confirmed as in FIG. 4.

Comparative Example 2

An optical device was manufactured in the same manner as in Example 1, except that the rubbing strength (RS1) of the alignment film in the first substrate was about 1.9 and the rubbing strength (RS2) of the alignment film in the second substrate was 7.6. Specifically, in the case of the rubbing strength (RS1), the number of rubbing times (N) in Equation 1 was 1, the rubbing depth (M) was about 0.005 mm or so, the radius (r) of the rubbing drum was about 70 mm, the rotation speed (n) of the rubbing drum was about 1000 rpm, and the moving speed (v) of the substrate was about 1160 mm/sec. In addition, in the case of the rubbing strength (RS2), the number of rubbing times (N) in Equation 1 was 1, the rubbing depth (M) was about 0.02 mm or so, the radius (r) of the rubbing drum was about 70 mm, the rotation speed (n) of the rubbing drum was about 1000 rpm, and the moving speed (v) of the substrate was about 1160 mm/sec.

FIG. 5 is the result of confirming horizontal orientation in a state where the optical device formed in the above-described manner is horizontally oriented by applying a voltage thereto, where it has confirmed that the horizontal orientation is poor as in FIG. 5.

Comparative Example 3

An optical device was manufactured in the same manner as in Example 1, except that the rubbing strength (RS1) of the alignment film in the first substrate was about 1.9 and the rubbing strength (RS2) of the alignment film in the second substrate was 519.9. Specifically, in the case of the rubbing strength (RS1), the number of rubbing times (N) in Equation 1 was 1, the rubbing depth (M) was about 0.005 mm or so, the radius (r) of the rubbing drum was about 70 mm, the rotation speed (n) of the rubbing drum was about 1000 rpm, and the moving speed (v) of the substrate was about 1160 mm/sec. In addition, in the case of the rubbing strength (RS2), the number of rubbing times (N) in Equation 1 was 1, the rubbing depth (M) was about 1.37 mm or so, the radius (r) of the rubbing drum was about 70 mm, the rotation speed (n) of the rubbing drum was about 1000 rpm, and the moving speed (v) of the substrate was about 1160 mm/sec.

FIG. 6 is the result of observing the presence of dotting unevenness on the optical device formed in the above-described manner, where the dotting unevenness was severely confirmed as in FIG. 6.

Comparative Example 4

An optical device was manufactured in the same manner as in Example 1, except that the rubbing strength (RS1) of the alignment film in the first substrate was about 1.9 and the rubbing strength (RS2) of the alignment film in the second substrate was 64.5. Specifically, in the case of the rubbing strength (RS1), the number of rubbing times (N) in Equation 1 was 1, the rubbing depth (M) was about 0.005 mm or so, the radius (r) of the rubbing drum was about 70 mm, the rotation speed (n) of the rubbing drum was about 1000 rpm, and the moving speed (v) of the substrate was about 1160 mm/sec. In addition, in the case of the rubbing strength (RS2), the number of rubbing times (N) in Equation 1 was 1, the rubbing depth (M) was about 0.17 mm or so, the radius (r) of the rubbing drum was about 70 mm, the rotation speed (n) of the rubbing drum was about 1000 rpm, and the moving speed (v) of the substrate was about 1160 mm/sec.

FIG. 7 is the result of confirming horizontal orientation in a state where the optical device formed in the above-described manner is horizontally oriented by applying a voltage thereto, where it has confirmed that the horizontal orientation is poor as in FIG. 7.

Comparative Example 5

An optical device was manufactured in the same manner as in Example 1, except that the rubbing strength (RS1) of the alignment film in the first substrate was about 110.1 and the rubbing strength (RS2) of the alignment film in the second substrate was 7.6. Specifically, in the case of the rubbing strength (RS1), the number of rubbing times (N) in Equation 1 was 1, the rubbing depth (M) was about 0.29 mm or so, the radius (r) of the rubbing drum was about 70 mm, the rotation speed (n) of the rubbing drum was about 1000 rpm, and the moving speed (v) of the substrate was about 1160 mm/sec. In addition, in the case of the rubbing strength (RS2), the number of rubbing times (N) in Equation 1 was 1, the rubbing depth (M) was about 0.02 mm or so, the radius (r) of the rubbing drum was about 70 mm, the rotation speed (n) of the rubbing drum was about 1000 rpm, and the moving speed (v) of the substrate was about 1160 mm/sec.

FIG. 8 is the result of observing the presence of dotting unevenness on the optical device formed in the above-described manner, where the dotting unevenness was severely confirmed as in FIG. 8.

The invention claimed is:

1. A method for manufacturing an optical device, comprising:
    rubbing a first rubbing alignment film of a first substrate including a first base layer, a spacer, the first rubbing alignment film formed on the first base layer;
    rubbing a second rubbing alignment film of a second substrate including a second base layer, the second rubbing alignment film formed on the second base layer,
    wherein the first or the second alignment film is a vertical alignment film,
    wherein no spacer is present in the second substrate,
    wherein a first rubbing strength (RS1) determined by Equation 1 below when rubbing the first rubbing alignment film and a second rubbing strength (RS2) determined by Equation 1 below when rubbing the second rubbing alignment film satisfy Equation 2 below, and wherein the first rubbing strength (RS1) is in a range of 2.5 to 100 and an average of the first and the second rubbing strengths (RS1 and RS2) is in a range of 12 to 250:

$$RS1 \text{ or } RS2 = 2 \times N \times M \times n \times n \times r/(v-1) \quad \text{[Equation 1]}$$

$$RS1 < RS2 \quad \text{[Equation 2]}$$

wherein, RS1 is the first rubbing strength when rubbing the first substrate alignment film, RS2 is the second rubbing strength when rubbing the second substrate alignment film, N is a number of rubbing times, M is a rubbing depth (unit: mm), r is a radius (unit: mm) of a rubbing drum, n is a rotation speed (unit: rpm) of the rubbing drum, and v is a relative moving speed (unit: mm/sec) of the substrate to the rubbing drum.

2. The manufacturing method according to claim 1, wherein the base layers of the first and second substrates are plastic films.

3. The manufacturing method according to claim 1, wherein an electrode layer is present on the first or the second base layer and the first or the second alignment film is formed on the electrode layer.

4. The manufacturing method according to claim 1, wherein the first or second alignment film comprises one or more selected from the group consisting of a polyimide compound, a polyvinyl alcohol compound, a polyamic acid compound, a polystyrene compound, a polyamide compound and a polyoxyethylene compound.

5. The manufacturing method according to claim 1, further comprising:
forming a light modulating layer between the first and second alignment films in a state where the first and second substrates are oppositely disposed so that the respective alignment films face each other.

6. The manufacturing method according to claim 1, further comprising:
dotting a light modulating material containing a liquid crystal compound on any one alignment film of the first and second substrates; and
pressing the other substrate of the first and second substrates in a state of being disposed opposite to the alignment film on which the light modulating material is dotted so that the dotted light modulating material fills a gap between the alignment films.

7. The manufacturing method according to claim 5, wherein the light modulating layer comprising a liquid crystal compound and a dichroic dye.

8. The manufacturing method according to claim 6, wherein the gap between the first and second substrates disposed opposite to each other is 4 µm or more.

9. The manufacturing method according to claim 6, wherein the light modulating material further comprises a dichroic dye.

10. The manufacturing method according to claim 6, wherein the gap between the first and second substrates disposed opposite to each other is less than 20 µm.

11. A method for manufacturing an optical device, comprising:
rubbing a first rubbing alignment film of a first substrate including a first base layer, a spacer, the first rubbing alignment film formed on the first base layer;
rubbing a second rubbing alignment film of a second substrate including a second base layer, the second rubbing alignment film formed on the second base layer,
wherein no spacer is present in the second substrate,
dotting a light modulating material containing a liquid crystal compound on any one alignment film of the first and second substrates; and
pressing the other substrate of the first and second substrates in a state of being disposed opposite to the alignment film on which the light modulating material is dotted so that the dotted light modulating material fills a gap between the alignment films;
wherein a first rubbing strength (RS1) determined by Equation 1 below when rubbing the first rubbing alignment film and a second rubbing strength (RS2) determined by Equation 1 below when rubbing the second rubbing alignment film satisfy Equation 2 below, and wherein the first rubbing strength (RS1) is in a range of 2.5 to 100 and an average of the first and the second rubbing strengths (RS1 and RS2) is in a range of 12 to 250:

$RS1 \text{ or } RS2 = 2 \times N \times M \times n \times \pi \times r/(v-1)$ [Equation 1]

$RS1 < RS2$ [Equation 2]

wherein, RS1 is the first rubbing strength when rubbing the first substrate alignment film, RS2 is the second rubbing strength when rubbing the second substrate alignment film, N is a number of rubbing times, M is a rubbing depth (unit: mm), r is a radius (unit: mm) of a rubbing drum, n is a rotation speed (unit: rpm) of the rubbing drum, and v is a relative moving speed (unit: mm/sec) of the substrate to the rubbing drum.

* * * * *